United States Patent [19]

Bolenbaugh et al.

[11] Patent Number: 4,560,039
[45] Date of Patent: Dec. 24, 1985

[54] DISC BRAKE ASSEMBLY SPRING

[75] Inventors: Daniel L. Bolenbaugh; John R. Wegh, both of South Bend, Ind.; Roger L. Smith, Niles, Mich.

[73] Assignee: Allied Corporation, Morristown, N.J.

[21] Appl. No.: 609,683

[22] Filed: May 11, 1984

[51] Int. Cl.⁴ ............................................ F16D 65/02
[52] U.S. Cl. ............................... 188/73.45; 188/73.35
[58] Field of Search ............... 188/73.31, 73.35, 73.36, 188/73.43, 73.44, 73.45

[56] References Cited

U.S. PATENT DOCUMENTS

| 3,648,807 | 3/1972 | Lottridge et al. | 188/73.43 |
| 3,782,510 | 1/1974 | Rath | 188/73.43 |
| 4,358,003 | 11/1982 | Johannesen et al. | 188/73.43 |
| 4,393,963 | 7/1983 | Oltmanns, Jr. et al. | 188/73.35 X |
| 4,418,798 | 12/1983 | Johannesen et al. | 188/73.35 X |

Primary Examiner—Duane A. Reger
Assistant Examiner—Richard R. Diefendorf
Attorney, Agent, or Firm—Ronald D. Welch; Ken C. Decker

[57] ABSTRACT

A disc brake assembly includes a caliper assembly and a torque member with matching slots to receive a pin assembly. A bolt is connected with the torque member arm to prevent separation between the caliper assembly and the torque member in the event the pin assembly separates from the torque member and caliper assembly.

2 Claims, 4 Drawing Figures

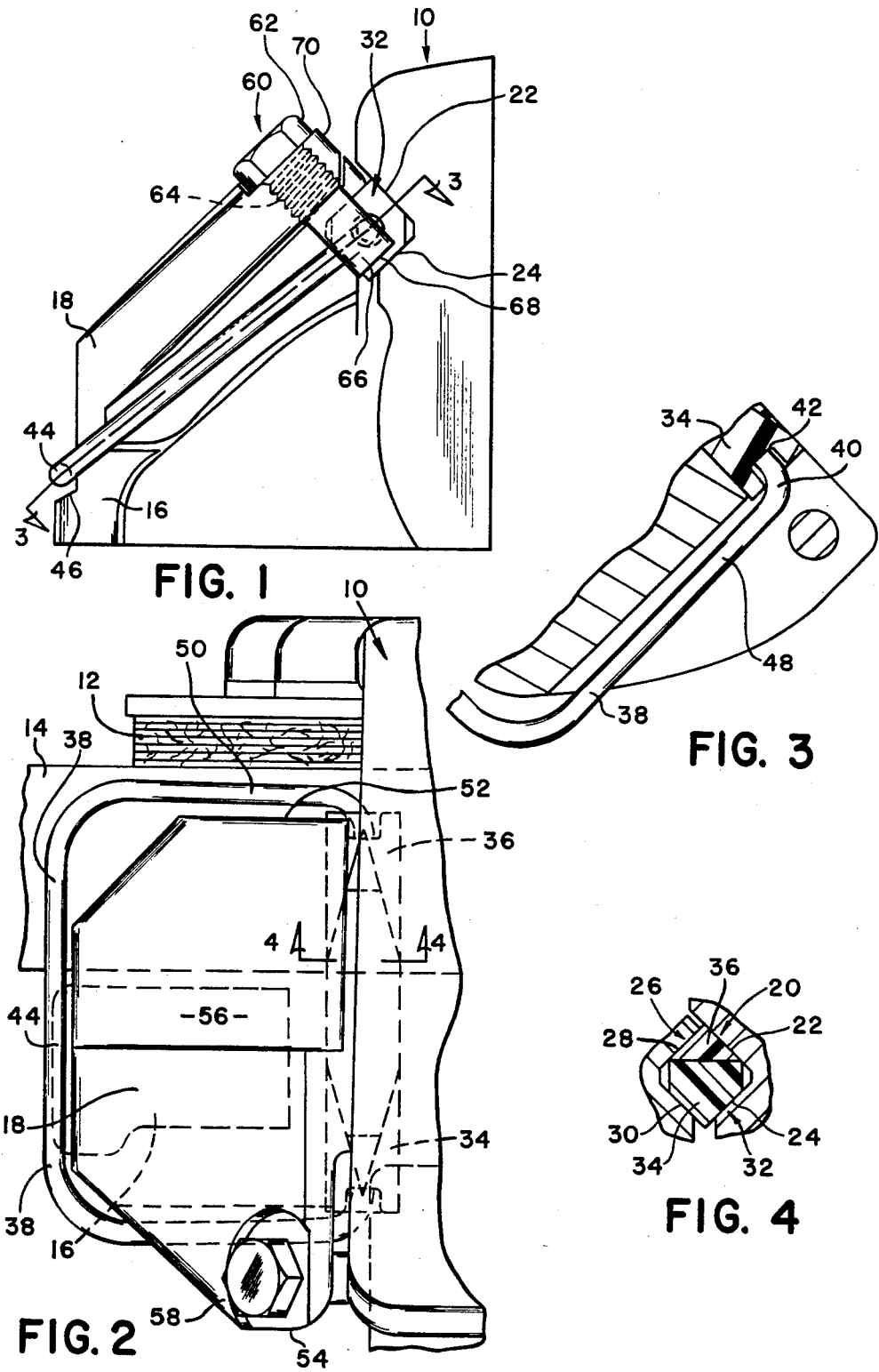

DISC BRAKE ASSEMBLY SPRING

The present invention relates to a disc brake wherein a torque member includes a pair of arms extending over an outer edge of a rotor so that a caliper assembly will be movably carried by the torque member pair of arms.

Heretofore, the caliper assembly and the torque member included matching slots for receiving a pin assembly which defined a sliding surface with the caliper assembly. A resilient member retained the pin assembly in the matching slot to prevent inadvertent withdrawal of the pin assembly. If the pin assembly did withdraw from the matching slot, the caliper assembly could separate from the torque member and render the disc brake inoperable.

The prior art is illustrated in U.S. Pat. No. 3,648,807 (Lottridge, et al.) and U.S. Pat. No. 4,418,798 (Johannesen, et al.).

The present invention covers a disc brake assembly comprising a caliper assembly movably carried on a torque member, the torque member and the caliper assembly including matching slots facing each other and extending axially, a pin assembly disposed within the matching slots to retain the caliper assembly juxtapositioned the torque member and a resilient member engageable with opposite ends of the pin assembly, characterized in that said torque member includes means projecting into said caliper assembly slot to oppose separation between one end of said resilient member and said pin assembly, said torque member means opposing axial withdrawal of said pin assembly in one direction and said torque member means further retaining said caliper member juxtapositioned said torque member in the event said pin assembly is displaced from said slots.

It is an advantage of the present invention that the torque member means serves many purposes to oppose withdrawal of the pin assembly while also providing a secondary retention preventing caliper assembly separation in the event the pin assembly separates from the caliper assembly and the torque member.

In the drawings, FIG. 1 is a partial side view of a torque member and caliper assembly for a disc brake;

FIG. 2 is a top view of FIG. 1;

FIG. 3 is a cross-sectional view taken along line 3—3 of FIG. 1, and

FIG. 4 is a cross-sectional view taken along line 4—4 of FIG. 2.

A disc brake includes, inter alia, a caliper assembly 10 cooperating with a pair of brake shoes, one of which is shown at 12 in FIG. 2 to bias the latter into engagement with a rotor 14 in a conventional manner. In order to movably support the caliper assembly 10 relative to the rotor 14, a torque member 16 includes a pair of arms, one of which is shown at 18, and the arms extend axially over the rotor 14. The caliper assembly 10 includes an axially extending slot 20 with a top planar surface 22 and a bottom planar surface 24. Similarly, the torque member arm 18 includes an axially extending slot 26 with a top planar surface 28 and a bottom planar surface 30. A pin assembly 32 is disposed within the matching slots 20 and 26 and the pin assembly comprises a pair of wedge keys 34 and 36 as more fully described in the aforementioned U.S. Pat. No. 4,418,798. A spring 38 is engageable with both keys 34 and 36 to bias the latter toward each other. An end 40 of the spring 38 is disposed within a recess 42 of key 34, as shown in FIG. 3. Similarly, an opposite end of the spring is received within a recess in the key 36. A middle leg 44 of spring 38 is disposed on a shoulder 46 on the torque member 16. A first leg 48 of the spring 38 extends from the middle leg 44 to the one end 40 and a second leg 50 extends from the middle leg 44 to the opposite end of the spring. The torque member arm 18 extends axially from an outer edge 52 above the rotor 14 to an inner edge 54 over the top of the spring first leg 48. The torque member arm 18 includes a robust portion 56 defining the slot surfaces 28 and 30 and adapted for absorbing braking torque, and a flange portion 58. The flange portion 58 is smaller in thickness than the robust portion 56, see FIG. 1, and a bolt 60 is connected to the flange portion 58 with a head 62 engaging an outer surface of the flange portion, a threaded section 64 coupled to the flange portion, and a shank 66 extending inwardly from the flange portion to oppose the spring one end 40 and pin assembly 32. The shank 66 is spaced axially from the slot surfaces 28 and 30 while extending into the groove formed by caliper assembly surfaces 22 and 24. The shank defines a bottom end 68 spaced slightly from the surface 24 while the side of the shank is spaced to a greater degree from the surface 22.

In the event the spring should fracture and separate from the pin assembly so that the pin assembly is displaced in the direction of the outer friction element 12, the caliper assembly 10 will remain trapped relative to the torque member arm 18 because the surface 22 is engageable with an edge 70 of arm 18 if the caliper assembly falls radially inward, and the surface 24 is engageable with the bottom end 68 of shank 66 if the caliper assembly is moved radially outward. Consequently, the bolt 60 resists inadvertent separation between the spring and the pin assembly key 34, opposes withdrawal of the pin assembly in the direction away from the outer friction element, and provides a safety catch to prevent separation of the caliper assembly from the torque member in the absence of the pin assembly.

We claim:

1. A disch brake assembly comprising a torque member and a caliper assembly movably carried thereon, the torque member and the caliper assembly including at least one pair of matching slots facing each other and extending axially, a pin assembly disposed within each said matching pair of slots to retain the caliper assembly juxtapositioned the torque member and a resilient member engageable with opposite ends of the pin assembly, said torque member including a robust portion defining that one of said matching pair of slots in said torque member, torque developed during braking being transmitted directly to said robust portion by said pin assembly, said torque member further defining a flange portion extending axially from said robust portion, and of dimension smaller than said robust portion, characterized in that said torque member includes means projecting into said caliper assembly slot to oppose separation between one end of said resilient member and said pin assembly, said torque member means including a bolt with a shank extending into one of said pair of matching slots, said torque member means opposing the axial withdrawal of said pin assembly in one direction and said torque member means further retaining said caliper assembly juxtapositioned said torque member in the event the pin assembly is displaced from said slots, and remaining spaced from said caliper assembly so long as said pin assembly remains in said pair of matching slots.

2. A disc brake assembly comprising a torque member and a caliper assembly movably carried thereon, the torque member and the caliper assembly including at least one matching pair of slots facing each other and extending axially, a pin assembly disposed within each said matching pair of slots to retain the caliper assembly juxtapositioned the torque member and a resilient member engageable with opposite ends of the pin assembly, said pin assembly defining recesses for receiving ends of said resilient member, characterized in that said torque member includes means projecting into said caliper assembly slot to oppose separation between one end of said resilient member and said pin assembly, said torque member means including a bolt with a shank extending into one of said pair of matching slots, and said bolt shank being disposed adjacent said resilient member one end to prevent complete withdrawal of said resilient member one end from said pin assembly recess, said torque member means opposing axial withdrawal of said pin assembly in one direction and said torque member means further retaining said caliper member juxtapositioned said torque member in the event said pin assembly is displaced from said slots.

* * * * *